July 16, 1963 K. ARKLESS 3,097,923
PREPARATION OF TITANIUM DIOXIDE
Filed May 27, 1960
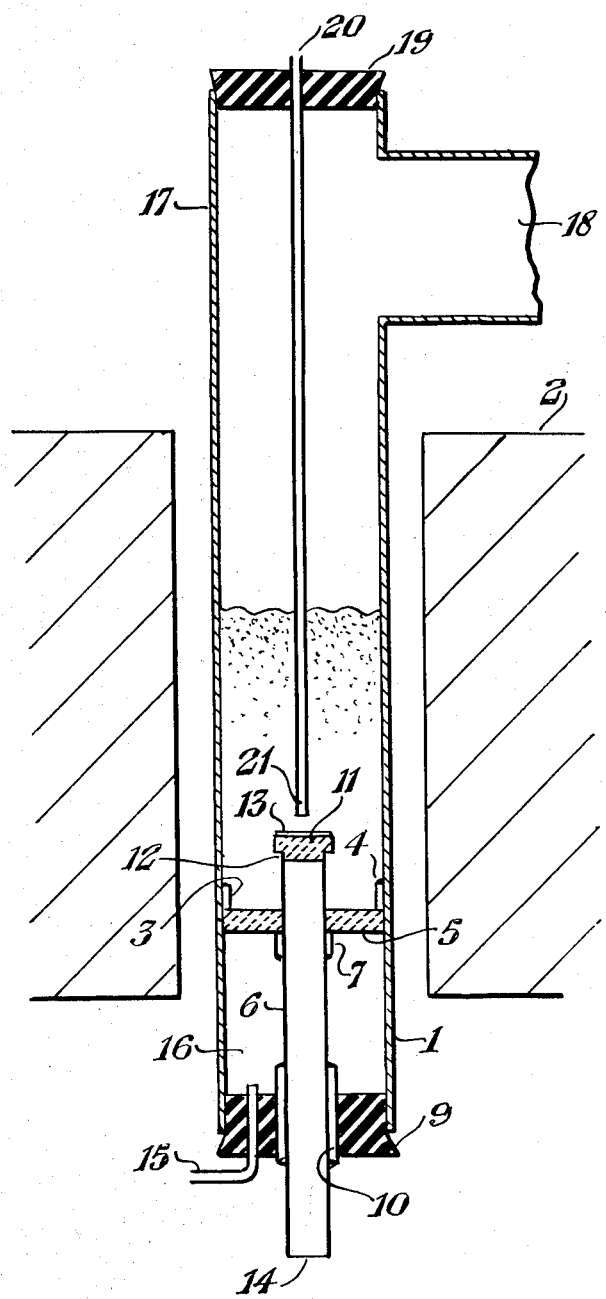
INVENTOR
KENNETH ARKLESS
Oscar L. Spencer
ATTORNEY fied July 16, 1963

3,097,923
PREPARATION OF TITANIUM DIOXIDE
Kenneth Arkless, Stockton-on-Tees, England, assignor to British Titan Products Company Limited, Durham, England, a company of the United Kingdom
Filed May 27, 1960, Ser. No. 32,445
8 Claims. (Cl. 23—202)

This invention comprises improvements in the preparation of titanium dioxide by the oxidation of titanium tetrachloride in the vapour phase in a fluidized bed.

United States patent specification 2,828,187 describes and claims a process for the production of titanium dioxide, comprising oxidizing titanium tetrachloride with air or other oxygen-containing gases, by feeding titanium tetrachloride in a fluidized bed of solid inert material, e.g. alumina, zircon or rutile, having a particle size of from approximately 40 microns to 1000 microns.

United States patent application 721,579, filed March 14, 1958, now U.S. 3,043,657, issued July 10, 1962, describes a development of the aforesaid process whereby it is caused to operate autothermally under controlled conditions.

In the operation of the process according to said patent specifications, although most of the titanium dioxide produced is carried forward out of the fluidized bed entrained with the product gases, a certain proportion of the titanium dioxide adheres to the substrate material comprising the bed. This, in the course of time, may cause the substrate material to increase in particle size until fluidization of the bed becomes inefficient. Having regard to this and for other reasons patent application 721,579 describes progressive renovation of the bed material in order to withdraw from the reactor deposits of titanium dioxide in the bed.

Such deposit of titanium dioxide in the bed represents a serious wastage and can jeopardize the economic operation of the fluidized bed technique. Even if such deposit is physically removed from the particles and recovered as titanium dioxide, it will not generally be in pigmentary form.

The prime object of the present invention is to reduce the deposit of titanium dioxide on the substrate material of the fluidized bed.

This object is achieved according to the present invention by a process for the preparation of titanium dioxide by the oxidation of titanium tetrachloride in the vapour phase in a fluidized bed of particulate solid inert material which is characterized by introducing into the bed, during the process, an agent or agents inducing or producing re-conversion to titanium tetrachloride of some titanium dioxide produced in the bed whereby accretion of titanium dioxide on the material of the bed is reduced.

The agents or agent introduced will attack the accretions of titanium dioxide on the bed particles and reconvert such accretions to titanium tetrachloride. The titanium tetrachloride produced will then react with the oxygen to produce titanium dioxide again, mainly in fine particle size such as will be conveyed out of the bed by the gases.

According to one embodiment of the present invention, a method of producing finely divided titanium oxide has been discovered which comprises forming a bed of inert particles at a temperature high enough to cause formation of titanium dioxide by reaction between titanium tetrachloride and an oxygen containing gas, introducing the bed titanium tetrachloride, an oxygen-containing gas, and an agent capable of converting titanium dioxide to titanium tetrachloride to thereby simultaneously form titanium dioxide and reconvert formed titanium dioxide to titanium tetrachloride, and carrying evolved titanium dioxide from the bed with the gases leaving the bed.

Further, in accordance with the present invention, an improvement has been discovered in a method of preparing titanium dioxide by establishing a fluidized bed of inert particles in an upwardly rising stream comprising titanium tetrachloride and oxygen, maintaining the temperature of the bed high enough to cause the titanium tetrachloride and oxygen to react to produce titanium dioxide, and carrying evolved titanium dioxide from the bed with the gas leaving the bed. This improvement comprises establishing in the bed while the reaction is being carried out a material capable of causing reconversion of titanium dioxide to titanium tetrachloride.

The aforesaid agent or agents preferably has, or together have, chlorinating and reducing actions, the combination of which will convert some titanium dioxide to titanium tetrachloride. There may accordingly be used, as said agents, chlorine gas and a reducing substance. The reducing substance may be or may comprise carbon monoxide and/or carbon.

Alternatively the aforesaid agent may be a compound having chlorine and carbon atoms in its molecule so that it possesses chlorinating and reducing functions. An example is phosgene.

Since chlorine itself is produced in the bed during the main oxidation process, the invention can be performed merely by introducing a reducing agent, such as carbon monoxide, which will act in conjunction with the chlorine produced in the bed to convert some titanium dioxide into titanium tetrachloride. It is however preferred to introduce chlorine or other chlorinating agent with the reducing agent rather than rely upon the chlorine produced in the bed.

Where, as will normally be the case, one is introducing an agent or agents which will react with oxygen, one should of course introduce the agent or agents at a point away from the immediate point of introduction of the oxygen. With this one proviso, the agent or agents may be introduced anywhere in the bed. The agent or agents may even be introduced at or near the surface of the bed; titanium dioxide accretions can still be converted at this point to titanium tetrachloride and, even if some unreacted titanium tetrachloride escapes above the bed, conditions can always be adjusted to cause this to react above the bed back to titanium dioxide.

It is preferred however to introduce the agent or agents either intermingled with the titanium tetrachloride or concentrically within the flow of titanium tetrachloride being introduced. In both cases, the main object is to shield the agent or agents from the oxygen until the agent or agents have performed their function of converting some titanium dioxide accretion to titanium tetrachloride.

The agent or agents introduced are preferably gaseous. Solids such as carbon can be used, but their introduction and protection from the oxygen in the bed presents more of a problem. If carbon or other solids are used, they are preferably introduced suspended in the titanium tetrachloride.

In the case where there are used chlorine gas and a reducing solid, the solid may be introduced in suspension in the chlorine gas. There may be used chlorine gas together with carbon monoxide and a solid reducing substance and in this case the solid reducing substance may be introduced into the bed in suspension in a mixture of the chlorine gas and carbon monoxide.

The theory believed to be involved with the present invention will now briefly be explained. The normal and most convenient way of carrying out the invention is by introducing a reducing gas, such as carbon monoxide, with or without chlorine mixed therewith, and the theory will be explained in this connection. It is believed that a hot reducing zone, somewhat akin to a Bunsen burner flame, is set up in the bed immediately in front of the point of introduction of the reducing agent. The bed particles move in and out of this zone due to their movement in the fluidized bed, and accretions of titanium dioxide on the particles become converted to titanium tetrachloride in this zone. Ambient oxygen will be consumed at the outer surface of this zone and will not penetrate into the zone. Ambient chlorine however will not be consumed at the surface of the zone but will be drawn into the zone to take part in the reaction therein, preferably in conjunction with additional chlorine introduced with the reducing agents.

The optimum effect is obtained when the reducing agent is introduced intermingled with or surrounded by the titanium tetrachloride feed. The titanium tetrachloride will then serve to consume ambient oxygen at the surface of the reducing zone, thereby reducing or nearly eliminating wastage of reducing agent by reaction with oxygen.

In addition to the agent or agents of the present invention, there may be introduced into the bed, preferably suspended in a gas, a metal e.g. aluminium.

In carrying out the process there may be oxidised in the bed, at the same time as the titanium tetrachloride, a relatively small proportion of the vapour of the chloride of another metal, or of a metalloid such as silicon.

The substrate material of the bed may be any of the various sand-like kinds such as are mentioned in the aforesaid patent specifications of U.S. Patents Nos. 2,828,187 and 3,043,657 or it may be a material on which titanium dioxide product of reaction has previously accumulated and which has been removed from the bed, suitably ground and dressed, so that a selected particle size range is available for re-use.

It will be appreciated that in carrying out the process of the present invention the various conditions and procedures may be generally along the lines of those described in our patent specifications of U.S. Patents Nos. 2,828,187 and 3,043,657.

For the production of anatase, the range of temperature is 700 to 1200° C., and the preferred range is 800 to 950° C. and this temperature may be initiated by prior burning of the carbon monoxide or other fuel gas with oxygen before the titanium tetrachloride is introduced.

The ratio of titanium tetrachloride to oxygen may range from 1:0.2 to 1:3; if auxiliary heating is employed, the carbon monoxide and oxygen will be proportioned in the ratio $2CO:O_2$ and if necessary the oxygen required to react with the carbon monoxide may be admitted in proximity to the carbon monoxide, but preferably within the bed. The proportion of oxygen and the oxygen containing gases relative to the titanium tetrachloride is selected primarily to yield the product most suitable, but wherever possible the lower proportion of oxygen to titanium tetrachloride, the stronger will be the concentration of chlorine generated and the greater the economy in recovery of chlorine, i.e., the more suitable will the gas mixture be for re-use in chlorination operations without special techniques for chlorine separation.

The time of contact of the gases within the chamber will be important, not only in regard to the completion of the reaction $TiCl_4+O_2=TiO_2+2Cl_2$, but also in regard to the nature of the product produced. Thus, where the time of contact is relatively short, a high temperature will be required, whereas with a long time of contact, lower temperatures will suffice. In the event of a long time contact at a high temperature, the tendency will be for the anatase form of $TiO_2$ to transform to rutile.

In the production of titanium oxide in the rutile form, the conditions will be similar to the above, and the temperature will vary from 700° C. to 1200° C. (preferably 800 to 1100° C.) depending on the time of contact.

The fluidizing velocity may vary from the minimum fluidizing velocity depending upon the density and particle size of the material comprising the fluidized bed to ten times the minimum velocity.

The amount of the aforesaid agent, or each of the aforesaid agents, introduced into the bed, should be at least about 10 mole percent based upon the quantity of titanium tetrachloride introduced into the bed. The amounts of the aforesaid agents, or each of the aforesaid agents established or introduced into the bed may vary from about 10 to 300 mole percent, and preferably between about 25 to 100 mole percent, based upon the quantity of titanium tetrachloride introduced into the bed, or, stated differently, the quantity of titanium tetrachloride in the upwardly rising stream in which the particles of the bed are suspended. In the embodiment where a mixture of carbon monoxide and chlorine is used, their molar proportions may be substantially equal to one another.

Apparatus which may be used for carrying out the process of the invention is illustrated diagrammatically in the accompanying drawing which is in sectional elevation.

Referring to this drawing the reactor is shown as a silica tube 1, of three inches internal diameter and four feet length, mounted vertically within an electrically heated furnace indicated by the reference numeral 2.

At a point fifteen inches from the bottom of the tube 1 is a ring 3, made of silica, projecting inwards and sealed to the tube at its top face 4. Against the lower face of the ring 3 is a tightly fitting porous ceramic plate 5 having a silica pipe 6, of one inch internal diameter, passing through its centre. This pipe 6 is held firmly against the ceramic plate 5 by means of a silica sleeve 7 welded thereto. The assembly is held firmly in position by a rubber bung 9 fitted into the bottom of the tube 1 and through which the silica pipe 6 passes, jacketted with an insulating sleeve 10.

The silica pipe 6 terminates one inch above the ceramic plate 5 and a porous ceramic disc 11 is sealed thereto at 12. The upper surface of the ceramic disc 13 is sealed by cement so that gases passing up through the pipe 6 will be ejected laterally rather than upwardly into the reaction chamber.

The pipe 6 is intended for the purpose of admitting titanium tetrachloride vapour introduced through ducting 14. The admission of oxygen is through a pipe 15 passing through the bung 9 into the wind box which is the space 16 between the bung 9 and the ceramic plate 5.

At the top 17 of the silica tube 1 there is formed a T-piece serving for the conveyance of the reaction products and gases from the reaction chamber through a conduit 18 for separation and collection. The upper part of the T-piece is sealed with a bung 19, and axially through bung 19 and the silica tube 1 passes a pipe 20 which serves to convey, and to discharge at a point 21 immediately above the ceramic disc 13, gases or gaseous suspensions constituting the agent or agents required to be introduced, according to the invention, into a bed of substrate material above the ceramic plate 5. The point 21 is suitably located 1 inch above disc 13 and the tube 20 has an internal diameter of ⅛ inch.

*Example I*

(A) The apparatus was filled above the porous ceramic plate 5 with a static layer, ten inches deep, of substrate material consisting of mineral zircon which had previously been withdrawn from a reactor employed for fluid bed oxidation of titanium tetrachloride. This substrate material had a particle size within the range 44–72 B.S.S. mesh.

Air admitted through the inlet pipe 15 entered the wind box 16 and then upwardly through the porous ceramic plate 5 into the substrate material which was thereby fluidised. When the apparatus had been heated to give a bed temperature of 1000° C. titanium tetrachloride vapour at a temperature of 250° C. was fed from 14 via the pipe 6 and admitted laterally into the bed through the porous ceramic disc 11. At the same time the air stream was replaced by an oxygen stream, and in this way reaction between the titanium tetrachloride and oxygen was established. The titanium tetrachloride was fed in at a rate corresponding to 30 milliliters liquid titanium tetrachloride per minute, and the oxygen at a rate of 18 litres, measured at room temperature, per minute.

After 30 minutes of operation the bed material was examined and it showed that an amount of titanium dioxide product was retained as an accretion on the substrate material. The recovered titanium dioxide product of reaction had a tinting strength of 1350.

(B) The following describes the application of the present invention to the procedure described in (A). Under the same conditions of temperature and feed rates of both titanium tetrachloride and oxygen there was additionally introduced, through the pipe 20 a mixture of carbon monoxide and chlorine fed at the rate of 2 litres per minute carbon monoxide and 2 litres per minute chlorine. After a period of 30 minutes the products of reaction and the bed were re-examined. It was found that the product had a tinting strength of 1360 and the bed retention had been reduced by 17.5% as compared with what is was in the case of (A) above.

*Example II*

This example was performed using the same apparatus as Example I.

(A) The procedure of Example I(A) was repeated, except with the following modifications. The bed was 6 inches deep when static and consisted of a sand-like $TiO_2$ having an average particle size of 44–72 B.S.S. mesh. The feed rate of the titanium tetrachloride was 55 mls. of liquid $TiCl_4$ per minute, and the oxygen was fed through conduit 15 at the rate of 18 litres per minute.

The product entrained from the bed and separated had a tinting strength of 1320. The accretion of $TiO_2$ on the substrate constituting the bed represented 43.5% of the titanium admitted as titanium tetrachloride.

(B) The procedure of Example I(B) was repeated, except that the carbon monoxide was fed at the rate of 3 litres per minute and the chlorine at 3 litres per minute.

The product entrained from the bed and separated was found to be a white pigment having a tinting strength of 1340. The amount of $TiO_2$ retained on the substrate of the bed was 34.8% of the titanium admitted as titanium tetrachloride.

In both Examples I and II, the feed rates mentioned therein were measured at normal temperature and pressure. The normal temperature is termed room temperature in Example I.

What is claimed is:

1. In a method of preparing titanium dioxide by introducing titanium tetrachloride and oxygen into a fluidised bed of inert particles maintained at a temperature sufficient to form titanium dioxide from reaction of titanium tetrachloride with oxygen so that some titanium dioxide is carried out with gases emanating from the bed and some titanium dioxide adheres to inert particles of the bed, the improvement which comprises while so preparing titanium dioxide, introducing to the bed a chlorinating agent comprising chlorine and carbonaceous substance capable of causing reconversion of at least a portion of the titanium dioxide adhering to the inert particles to titanium tetrachloride whereby to reduce said adherence in said bed and providing in the bed sufficient oxygen to oxidize the titanium tetrachloride produced on said reconversion to form titanium dioxide.

2. The process of claim 1 wherein at least a portion of the chlorine of said agent is the chlorine formed by the reaction of titanium tetrachloride with oxygen.

3. The method of claim 1 wherein said agent comprises a mixture of chlorine, carbon and carbon monoxide.

4. The method of claim 1 wherein said agent comprises phosgene.

5. The method of claim 1 wherein the amount of said agent is about 10 to 300 mole percent based upon the quantity of titanium tetrachloride in the upwardly rising stream.

6. The method of claim 1 wherein the amount of said agent established in the bed is at least 10 mole percent, based upon the quantity of titanium tetrachloride introduced into the bed.

7. The process of claim 1 wherein the chlorinating agent is chlorine and carbon.

8. The process of claim 1 wherein the chlorinating agent is chlorine and carbon monoxide.

References Cited in the file of this patent

UNITED STATES PATENTS

| | | |
|---|---|---|
| 2,670,275 | Olson et al. | Feb. 23, 1954 |
| 2,760,846 | Richmond et al. | Aug. 28, 1956 |
| 2,828,187 | Evans et al. | Mar. 25, 1958 |
| 2,855,273 | Evans et al. | Oct. 7, 1958 |